United States Patent
Yang (10) Patent No.: US 7,298,114 B2
(45) Date of Patent: Nov. 20, 2007

(54) NICKEL HYDROGEN/NICKEL CADMIUM BATTERY CHARGER WITH THE FUNCTION OF EMERGENCY POWER SUPPLY

(76) Inventor: Fu-I Yang, 5th Floor, 101, Hsin Pu 8th Street, Taoyuan City (TW)

( * ) Notice: Subject to any disclaimer, the term of this patent is extended or adjusted under 35 U.S.C. 154(b) by 483 days.

(21) Appl. No.: 11/023,497

(22) Filed: Dec. 29, 2004

(65) Prior Publication Data
US 2006/0139011 A1    Jun. 29, 2006

(51) Int. Cl.
*H02J 7/04* (2006.01)
*H02J 7/16* (2006.01)

(52) U.S. Cl. .............. 320/141; 320/108; 320/118; 320/119; 320/120; 320/121; 320/125; 320/137; 320/145; 320/162; 320/165; 307/66

(58) Field of Classification Search ............ 320/108, 320/118, 119, 120, 121, 125, 137, 141, 145, 320/162, 165; 307/66
See application file for complete search history.

(56) References Cited

U.S. PATENT DOCUMENTS

| | | | |
|---|---|---|---|
| 5,493,197 A * | 2/1996 | Eguchi et al. ............. 320/116 |
| 6,172,479 B1 * | 1/2001 | Barton ....................... 320/121 |
| 6,762,588 B2 * | 7/2004 | Miyazaki et al. ........... 320/116 |
| 6,841,971 B1 * | 1/2005 | Spee et al. .................. 320/119 |
| 2003/0006737 A1 * | 1/2003 | LaFollette et al. ......... 320/137 |

* cited by examiner

*Primary Examiner*—Bao Q. Vu
*Assistant Examiner*—Johali A Torres Ruiz
(74) *Attorney, Agent, or Firm*—Rosenberg, Klein & Lee (57) ABSTRACT

A NiH/NiCd (nickel hydrogen/nickel cadmium) battery charger with the function of emergency power supply unit having a main body with a charging chamber and a charging circuit positioned within the main body to allow an electric connection to the charging chamber and the power input interface. This charging control circuit is controlled by an electrical switch which divides the charging chamber into two or more parts. When the power input interface is connected, the electrical switch shuts off automatically to make the batteries in the charging chamber to be charged in groups. This is the function of charger. When the power input interface is switched off, the batteries in different circuit are joined in series to supply power as an emergency power supply unit. Therefore, with the design principle of "separate charging and common sharing", it can protect the rechargeable batteries and provide power in lacking of power supply unit outdoors.

7 Claims, 9 Drawing Sheets

NICKEL HYDROGEN/NICKEL CADMIUM BATTERY CHARGER WITH THE FUNCTION OF EMERGENCY POWER SUPPLY

BACKGROUND OF THE INVENTION

1. Field of the Invention

The present invention relates to a NiH/NiCd (nickel hydrogen/nickel cadmium) battery charger with the function of emergency power supply, and more particularly to a charger in which the batteries can be charged separately in different charging circuits during the charging status. When they are not charged, the batteries in different circuits will be automatically connected in series to supply power as an emergency power supply unit.

2. Description of the Prior Art

Since portable electronic products, such as digital cameras, game players, personal digital assistant (PDA), cellular phone, LED illuminating devices, etc. become more and more popular, a greater capacity of secondary batteries is much required. In addition, the charging time is preferably shorter and the charger's volume is preferably smaller. Therefore, a smaller and cheaper charger with shorter charging time and longer service life is anticipated by the market.

Figure 1:
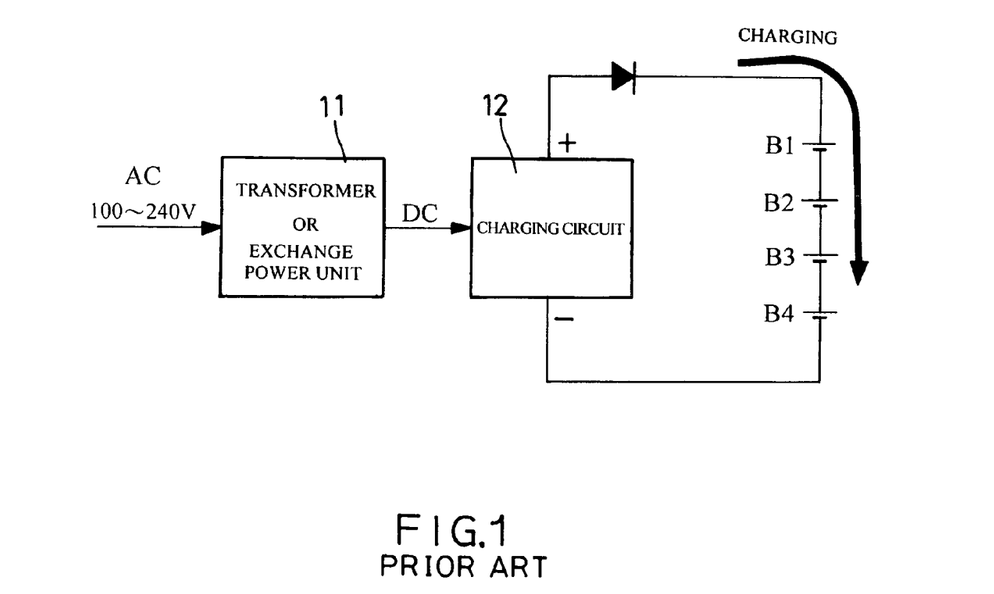
FIG. 1 is a circuit diagram of a conventional charger in series circuit.

The conventional NiH/NiCd battery chargers have their own advantages and disadvantages. However, they still can't reach the expected effects and need to be improved. These are described as follows:

Referring to FIG. 1, a conventional series charger is shown. This charger utilizes a transformer or an exchange power unit 11 to convert the power mains AC 100~240V into DC voltage. Meanwhile, the batteries B1, B2, B3, and B4 . . . in series connection are charged by a charging circuit 12. This charging mode has advantages of simple configuration and low price. However, its disadvantage lies in that one is fully charged while the others are not. This will easily cause overcharge of the full-charged battery when the charging process is continued, thereby lowering its service life.

Figure 2:
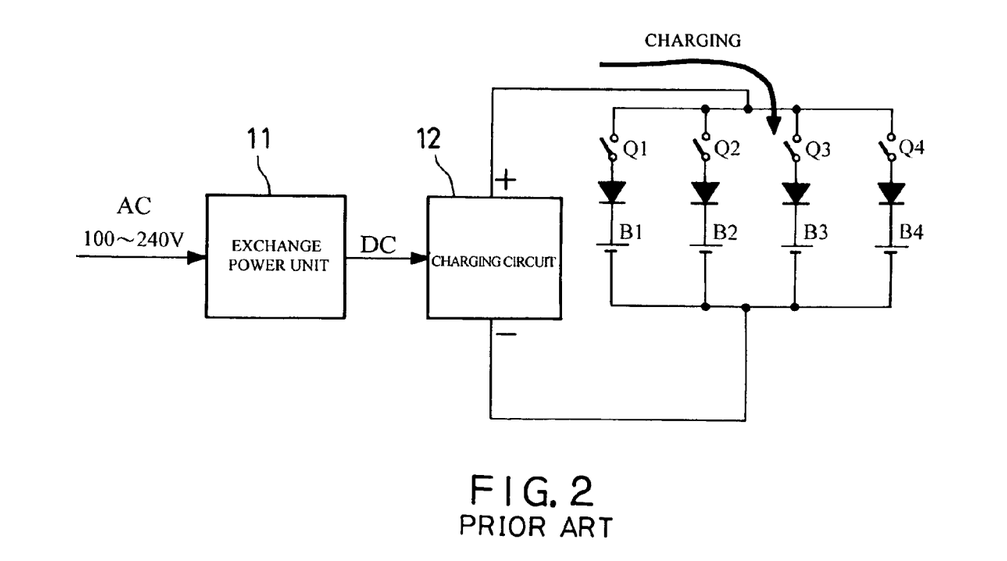
FIG. 2 is a circuit diagram of a conventional charger in parallel circuit.

Referring to FIG. 2, a conventional charger in parallel is shown. All parallel-connected batteries B1, B2, B3, and B4 are charged by a charging circuit 12. The advantage thereof lies in that every battery has almost identical charging voltage without disadvantages of overcharge or being not-fully-charged status of the series batteries. However, the greatest disadvantage of the parallel charger lies in that it can't meet the speedy charging requirement. Moreover, the choice and the installation of the electronic control elements are difficult. Supposed that the charging voltage is 2V, and the charging current of each parallel-connected battery is 1.5 A, the required total current will amount to 16 A. However, the diode of the electronic components has problem with internal resistance. In addition, the transistor has problem with pressure difference. To create a low-voltage and high-current charging loop has much to be overcome. For example, it's difficult to fulfill the safety requirement that the wiring of the circuit board has to amount to over 16 mm. Thus, the volume of the parallel charger can't be reduced. Moreover, the components are easily over-heated. Furthermore, the rapid charging requirement can't be fulfilled. If the voltage is increased to enhance the power and to reduce the current value, the four switch transistors Q1, Q2, Q3, Q4 will due to the pressure difference produce a high temperature which is difficult to be overcome. And to add cooling elements will increase the whole volume and the material cost.

The conventional charges, either serial or parallel ones, have disadvantages to some extent. Especially the normal charger is just used now only for charging NiH/NiCd batteries. It is a pity that the other functions of this kind of charger are not used. Therefore, the inventor concentrates on the innovations, in the hope that the current chargers can also supply power as a power supply unit in case of emergency without changing the structure of the conventional charger, increasing the cost, size and using complicated parts. For this purpose, the batteries in the parallel charger must be connected in series to provide sufficient voltage, but it is not very easy. For the four batteries in series, they can provide high voltage, but as above mentioned, there is a disadvantage of overcharging or not full charging which may shorten the battery life. Therefore, the topic how to enlarge the charging capacity as well as to fulfill the function of emergency power supply, will be discussed hereinafter.

SUMMARY OF THE INVENTION

It is a primary object of the present invention to eliminate the aforementioned drawbacks of the conventional current charger for NiH/NiCd secondary batteries by a design principle of "separate charging and common sharing". During the charging process, a plurality of batteries can be charged individually in the respective charging circuit to avoid the problem of over-charging or not full charging. When used, the batteries in different charging circuits are automatically connected in series to provide adequate voltage. It can be used as an emergency power supply unit in case of emergency.

Another object of the invention is to provide a NiH/NiCd charger that can be used as a portable power supply unit when we go outdoors. The charger can supply power to the electrical products with batteries in the charging chamber.

A further object of the invention is to provide a multi-functional charger with the unique circuit design and different emergency power output interfaces for power supply to various electrical products, thereby achieving the multi-functional effect.

BRIEF DESCRIPTION OF THE DRAWINGS

The accomplishment of this and other objects of the invention will become apparent from the following descriptions and its accompanying drawings of which.

DETAILED DESCRIPTION OF THE PREFERRED EMBODIMENT

Figure 3A:
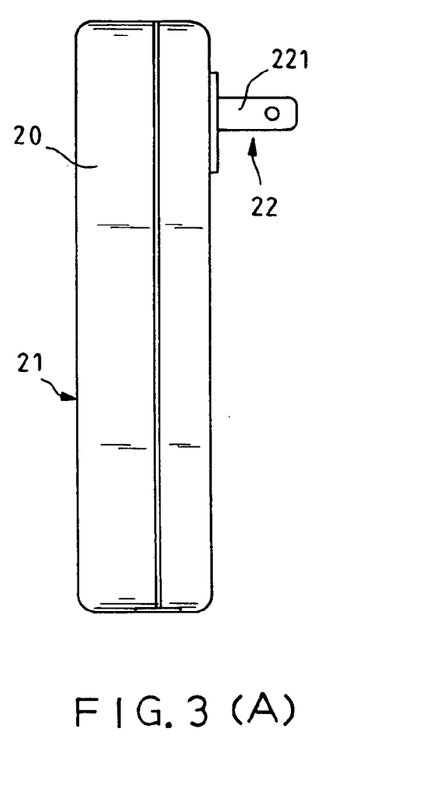
FIG. 3A is a side view of a first embodiment of a charger in accordance with the invention.
Figure 3B:
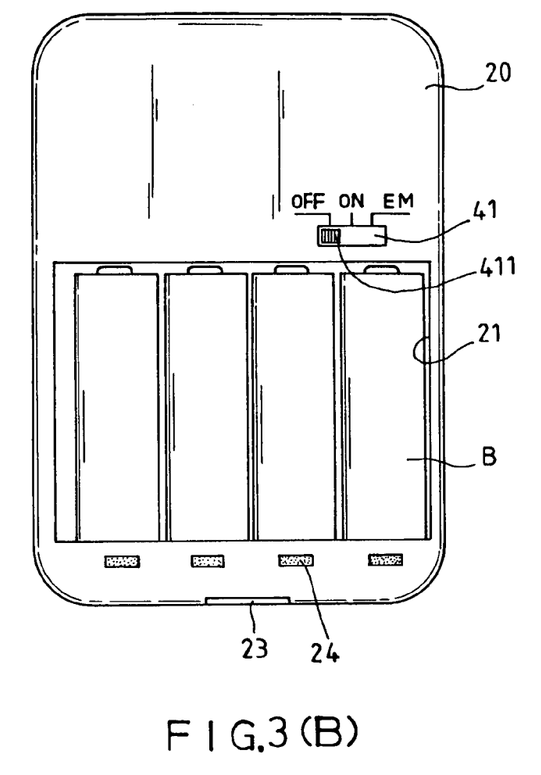
FIG. 3B is a front view of the first embodiment of the charger in accordance with the invention.
Figure 3C:
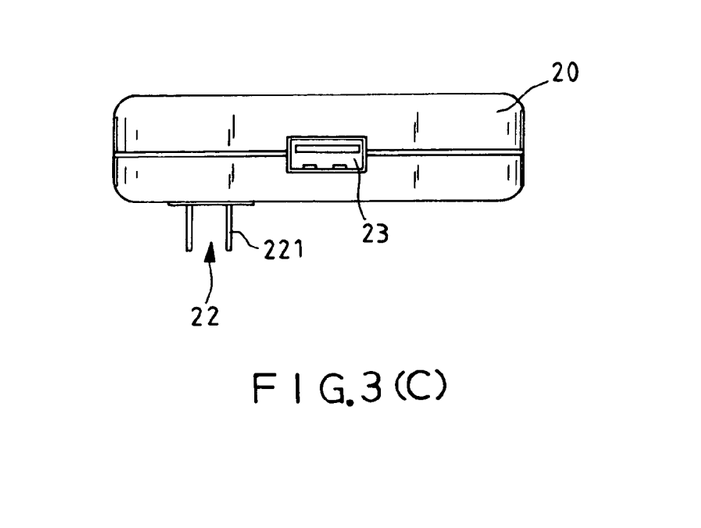
FIG. 3C is a top view of the first embodiment of the charger in accordance with the invention.

First of all, referring to FIGS. 3A, 3B and 3C, an applicable embodiment of the invention includes:

a main body 20;

a charging chamber 21 in the main body 20 for accommodating four NiH/NiCd secondary batteries (B); and a power input interface 22 under the main body 20.

In the embodiment according to FIGS. 3A, 3B and 3C, the power input interface 22 is constructed as a plug 221. Furthermore, an emergency power supply output interface 23 is positioned at one side of the main body 20 which can be designed as a universal serial bus (USB) port to couple with various electrical products available in the market. Of course, it can be also a normal connector. In addition, a plurality of light-emitting diode (LED) indicators 24 is mounted on the surface of the main body 20 for indicating the charging status of the batteries (B) in the charging chamber 21.

Figures 4A, 4B, 4C:
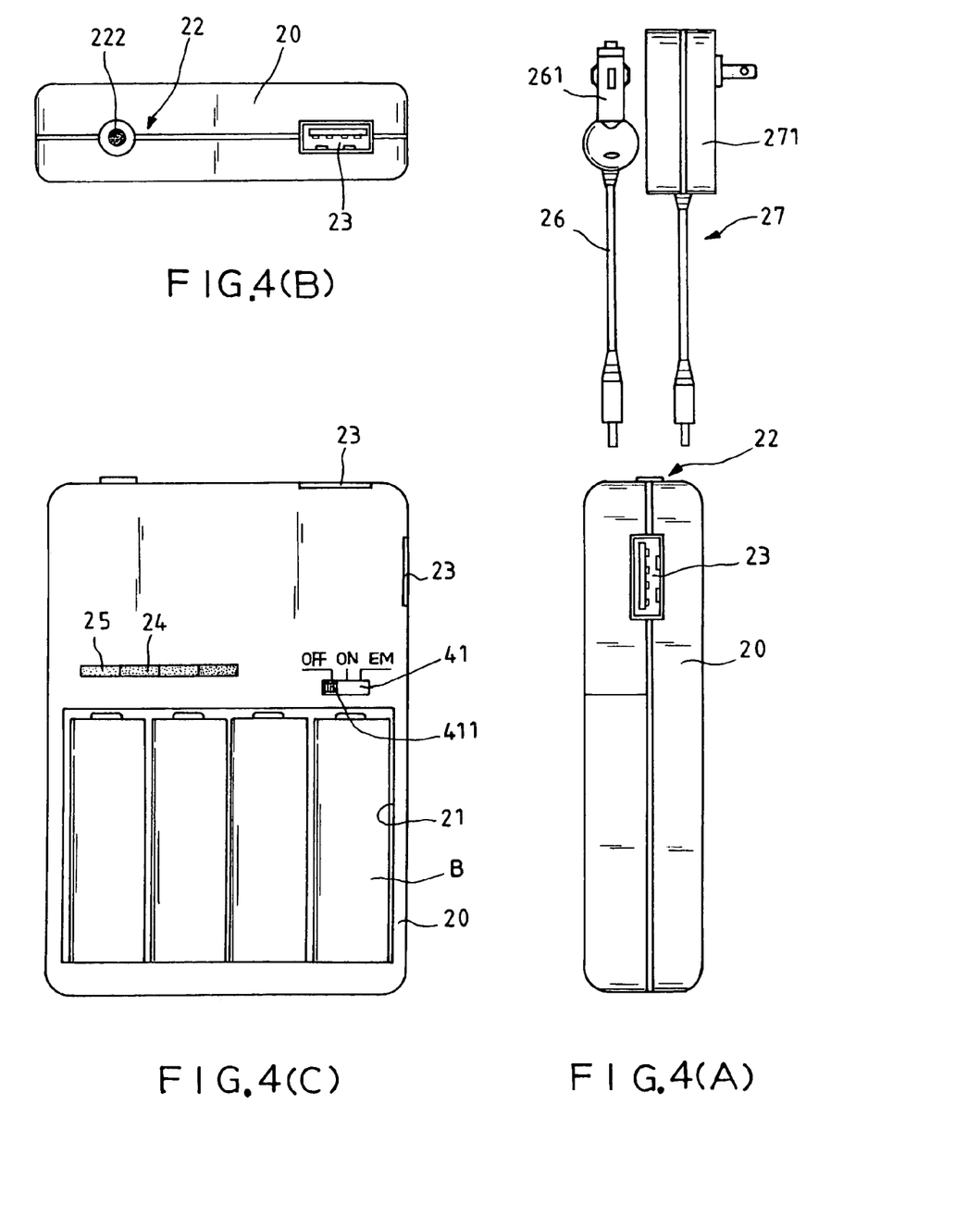
FIG. 4A is a side view of a second embodiment of a charger in accordance with the invention.
FIG. 4B is a front view of the second embodiment of the charger in accordance with the invention.
FIG. 4C is a top view of the second embodiment of the charger in accordance with the invention.

Another applicable embodiment in respect of a different appearance of the invention is shown in the FIGS. 4A, 4B and 4C. For example, the power input interface 22 can be designed as a jack for receiving a connecting cable 26 of a cigarette lighter 261, a connecting cable 27 of an adapter 271, etc. The emergency power supply output interface 23 can be placed at one side or two sides to meet the requirements. The arrangement of the invention is various and will not be explicitly described hereinafter.

Figure 5:
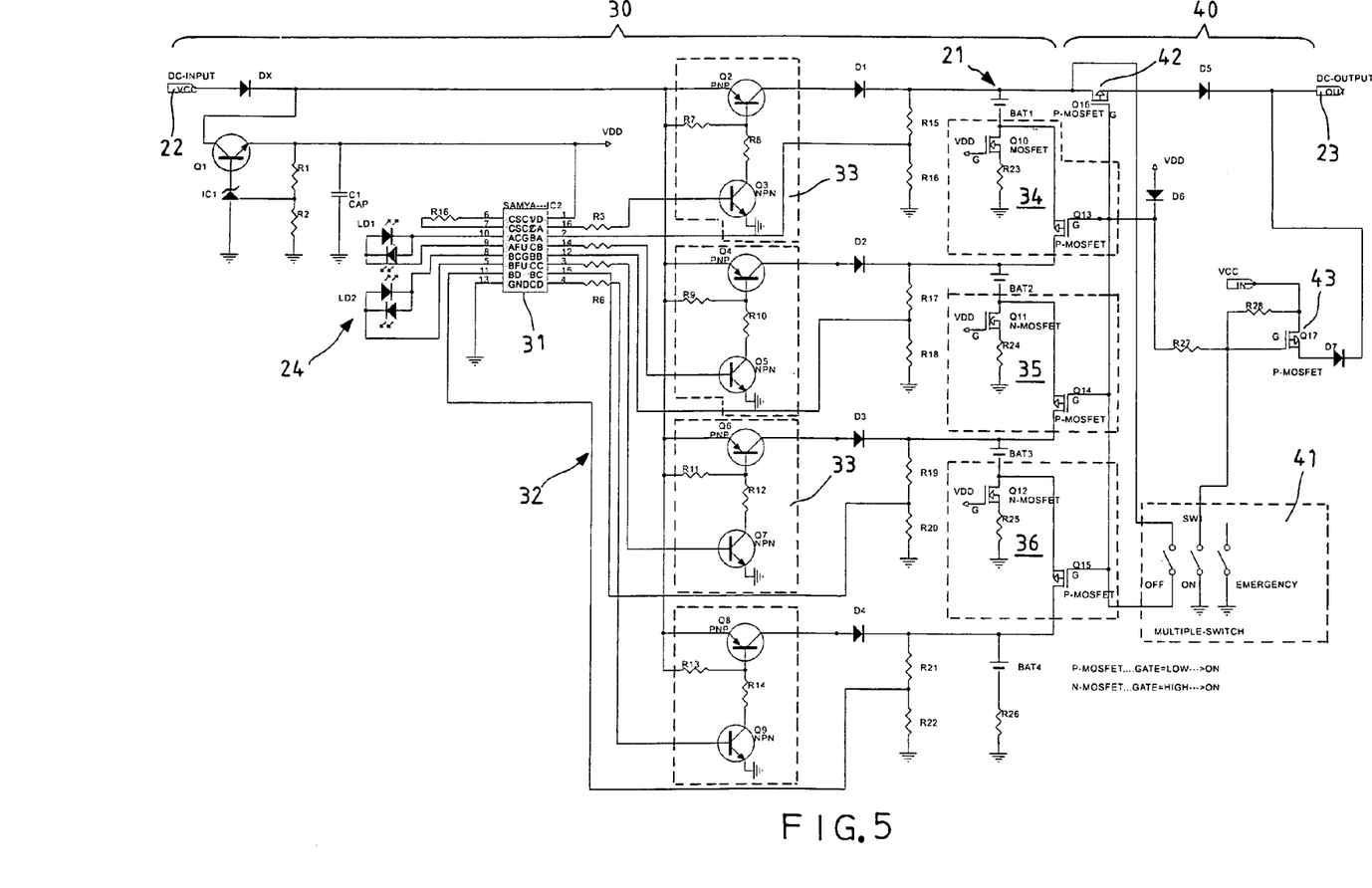
FIG. 5 is a detailed circuit diagram of an applicable embodiment of the invention.

The charging chamber 21 of the invention looks fairly no different with normal ones, but the important character of the invention is the charging control circuit 30 in the main body 20. This charging control circuit 30, as shown in FIG. 5, is interposed between the power input interface 22 and the charging chamber 21 to control the charging process of four batteries. However, in order to employ the invention as an emergency power supply unit, those four batteries must be linked in series to create the adequate voltage. In this way, when the four series-connected batteries are charged, the problem of overcharging or not fully charging will appear and the life span of the batteries will be significantly shortened.

Figure 6:
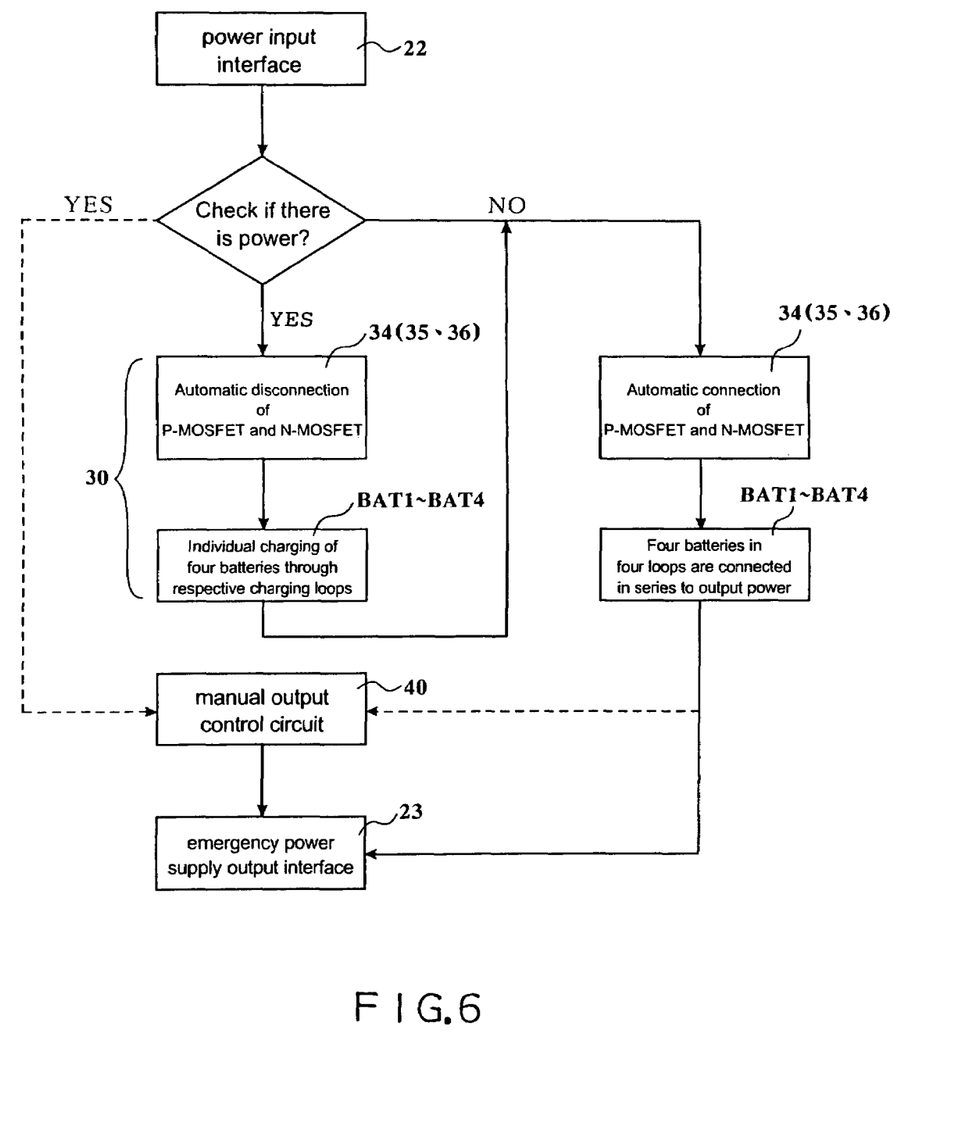
FIG. 6 is a block diagram of the main configuration of the invention.

For this purpose, a design principle of "separate charging and common sharing" is adopted in the invention. As shown in FIG. 6 for the structure, when the power input interface 22 is switched on, it will be disconnected automatically by three electrical switches 34, 35, 36 and the four batteries are charged separately in four groups of charging circuits to avoid the disadvantages of series charging. But for the batteries which are charged separately, they are not able to supply the required high voltage in case of emergency. Therefore, when the batteries are not charged, the three electrical switches 34, 35, 36 will be activated automatically to link automatically the four batteries which were charged in independent circuits in series. Then the four series-connected batteries can supply adequate voltage. The voltage output from this power source with four series-connected batteries can be controlled by a manual output control circuit 40, or this voltage can be provided directly through the emergency power supply output interface 23 for the electrical products. A derivation from this embodiment is that, when the batteries are charged, the input voltage can be supplied to the manual output control circuit 40 directly without through the charging control circuit 30. Then this voltage is supplied to electrical products via the emergency power supply output interface 23.

The above mentioned design conception of "separate charging and common sharing" will be described in detail with respect to the different charging and emergency power supply modes in FIGS. 7 and 8.

Figure 7:
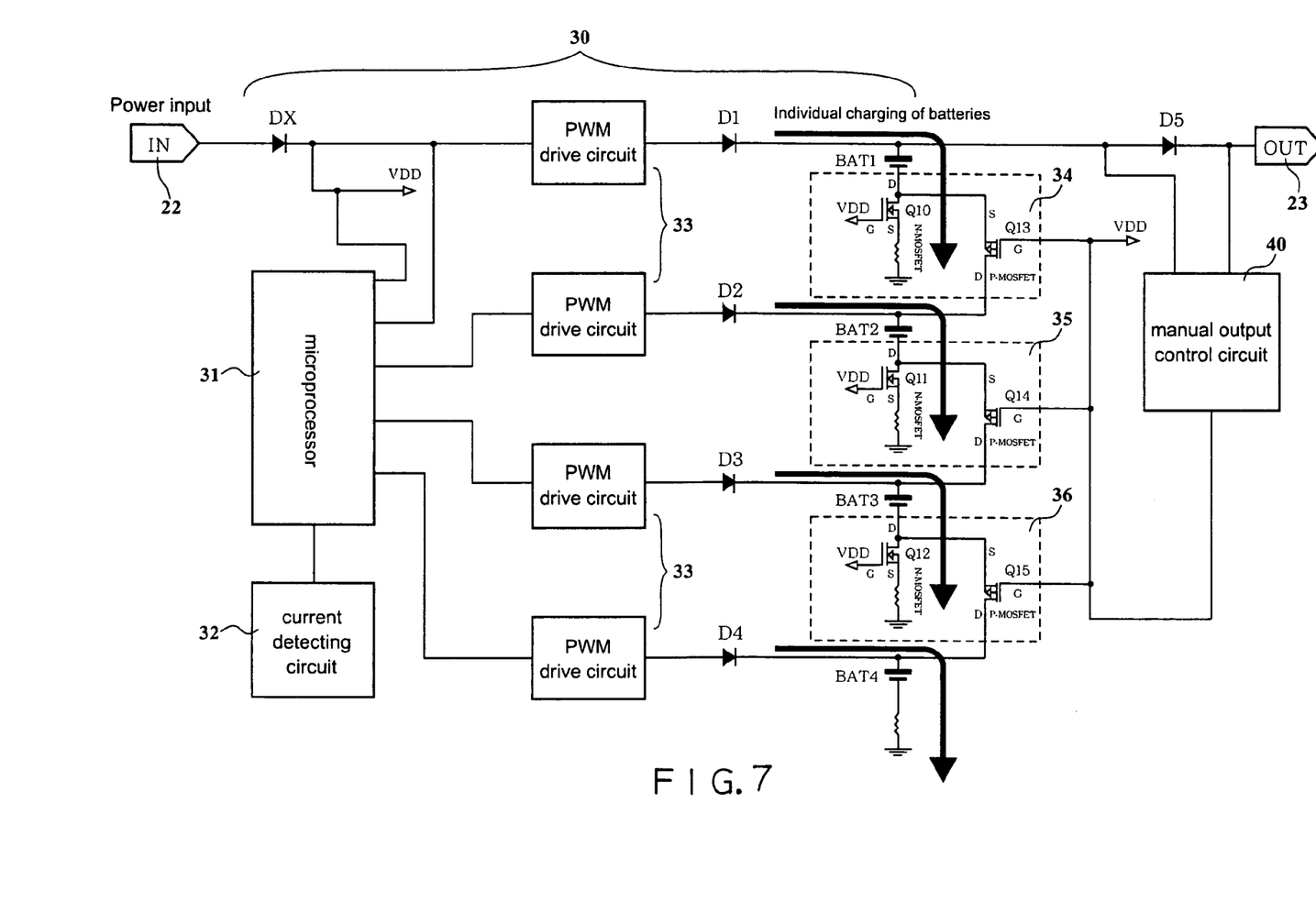
FIG. 7 is a simplified circuit diagram according to FIG. 5, showing that the batteries each undergo the individual charging process in case that input power is provided.

Referring to FIG. 7, a circuit diagram for batteries in charging process is shown. The charging control circuit 30 consists of a microprocessor 31, a current detecting circuit 32 and a plurality PWM drive circuits 33 in connection with four diodes (D1~D4) for driving the charging circuits (BAT1~BAT4) and three electrical switches 34, 35, 36. Those three electrical switches divide the four batteries into four groups of charging circuits (BAT1~BAT4). In other words, the first electrical switch 34 is interposed between the first and the second charging circuits (BAT1, BAT2), the second electrical switch 35 between the second and the third charging circuits (BAT2, BAT3), and the third electrical switch 36 between the third and the fourth charging circuits (BAT3, BAT4). In this way, if two charging circuits need an electrical switch, therefore, eight charging circuits need seven electrical switches. Since this embodiment illustrates one of the most popular chargers for four NiH/NiCd secondary batteries, three electrical switches 34, 35, 36 are employed in this embodiment. Each electrical switch is made of a series connection of an N-Channel metal oxidation semi-conductor field effect transistor (N-MOSFET) with a P-CHANNEL metal oxidation semi-conductor field effect transistor (P-MOSFET). The source (S) of the N-MOSFET (Q10) in each electrical switch (such as the first one 34) is grounded, the gate thereof is connected with the power source (VDD), and the drain (D) thereof with the negative terminal of the previous charging circuit (such as the first charging circuit BAT1). Moreover, the source (S) of the P-MOSFET (Q13) is connected to the drain of the N-MOSFET (Q10), the gate (G) thereof to the power source (VDD), and the drain (D) to the positive terminal of the following charging circuit (such as the second BAT2). The second and third electrical switches are also connected in this way and no further descriptions thereto are given hereinafter.

When the power input interface 22 is electrically loaded, the PWM drive circuit 33 is activated (ON), and the N-MOSFETs (Q10)、(Q11)、(Q12) of the first, the second and the third electrical switches (34)、(35)、(36) are also on, whereas the P-MOSFETs (Q13)、(Q14)、(Q15) are off. Therefore, four separate charging circuits (BAT1, BAT2, BAT3 and BAT4) are automatically divided to charge the four batteries individually. The black line in bold type shows the direction of charging current. When the batteries in the charging circuits (BAT1~BAT4) are fully charged, as shown in FIG. 5, the microprocessor 31 detects a signal through the current detecting circuit 32 to light up the LED indicators 24.

Figure 8:
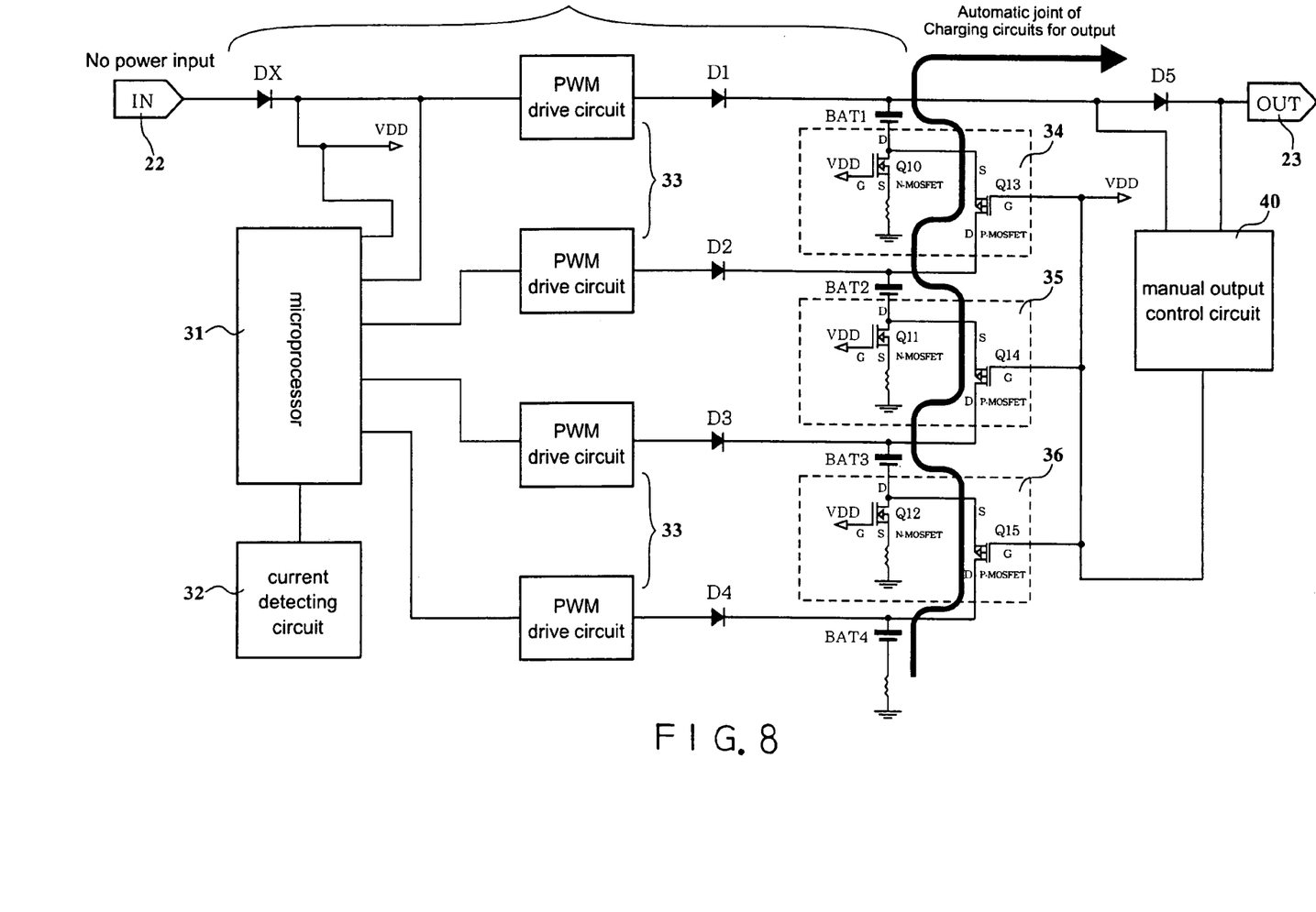
FIG. 8 is a simplified circuit diagram according to FIG. 5, showing that the charging loops are automatically coupled for power output when the batteries are fully charged.

As shown in FIG. 8, when the power input interface 22 is electrically unloaded, the batteries in the charging chamber 21 are fully charged. When the power source is removed, there is no voltage in the charging control circuit 30 and each PWM drive circuit 33 is off; therefore, the N-MOSFETs (Q10~Q12) of the first, the second and the third electrical switches (34~36) are off, whereas the MOSFETs (Q13~Q15) are on. The four batteries in the first, the second, the third and the fourth charging circuits (BAT1~BAT4) are connected in series automatically to supply power. The black line in bold type shows the direction of power flow which is directed to the emergency power supply output interface 23. Since the four batteries are connected in series, they can provide adequate voltage to the electrical products (such as PDA、MP3、LED, etc.). Also, a DC-AC transformer (not shown) can covert the direct current into alternating current and supply the AC electrical mini products such as power saving PL-lamp und cool cathode fluorescent lamp (CCFL).

As shown in the FIGS. 5 through 8, another embodiment of the invention can be designed as follows. A manual output control circuit 40 is installed before the emergency power supply output interface 23. It consists of a multistage selector 41 and two p-MOSFETs 42, 43. With a button 411 of this multistage selector 41 on the surface of main body 20 (shown in FIG. 3C), the emergency power supply output interface 23 can be freely set to one of the different modes OFF, ON or EMERGENCY. The mode OFF means that the emergency power supply output interface 23 does not supply any power. Mode ON means the charging batteries can supply directly and not be controlled by the charging control circuit 30. EMERGENCY means that batteries in different charging circuits are connected in series to supply power. The modes can be selected according to the requirements. This multi-switch employed in the invention to control the voltage output is a mature technique, so that no further descriptions thereto are given hereinafter.

FIG. 5 shows the main circuit of the invention. Those who are familiar with this art can take advantage of it. Since the microprocessor 31, the current detecting circuit 32 and the PWM drive circuit 33 are conventional charging circuits and do not belong to the object of the invention, no further decryptions thereto are given hereinafter. The unique character of the invention lies in the design of electrical switches which divide the charging chamber 21 into four independent parts (BAT1~BAT4). When the power source is removed, the four batteries in four charging loops link together automatically and supply power as a practical power supply unit. This feature makes the invention to be a charger normally and also an emergency power supply unit in case of emergency or going outdoors. Furthermore, it can conveniently supply electrical power to all kinds of electronic products such as PL-lamp, CCFL, etc.

Figure 9:
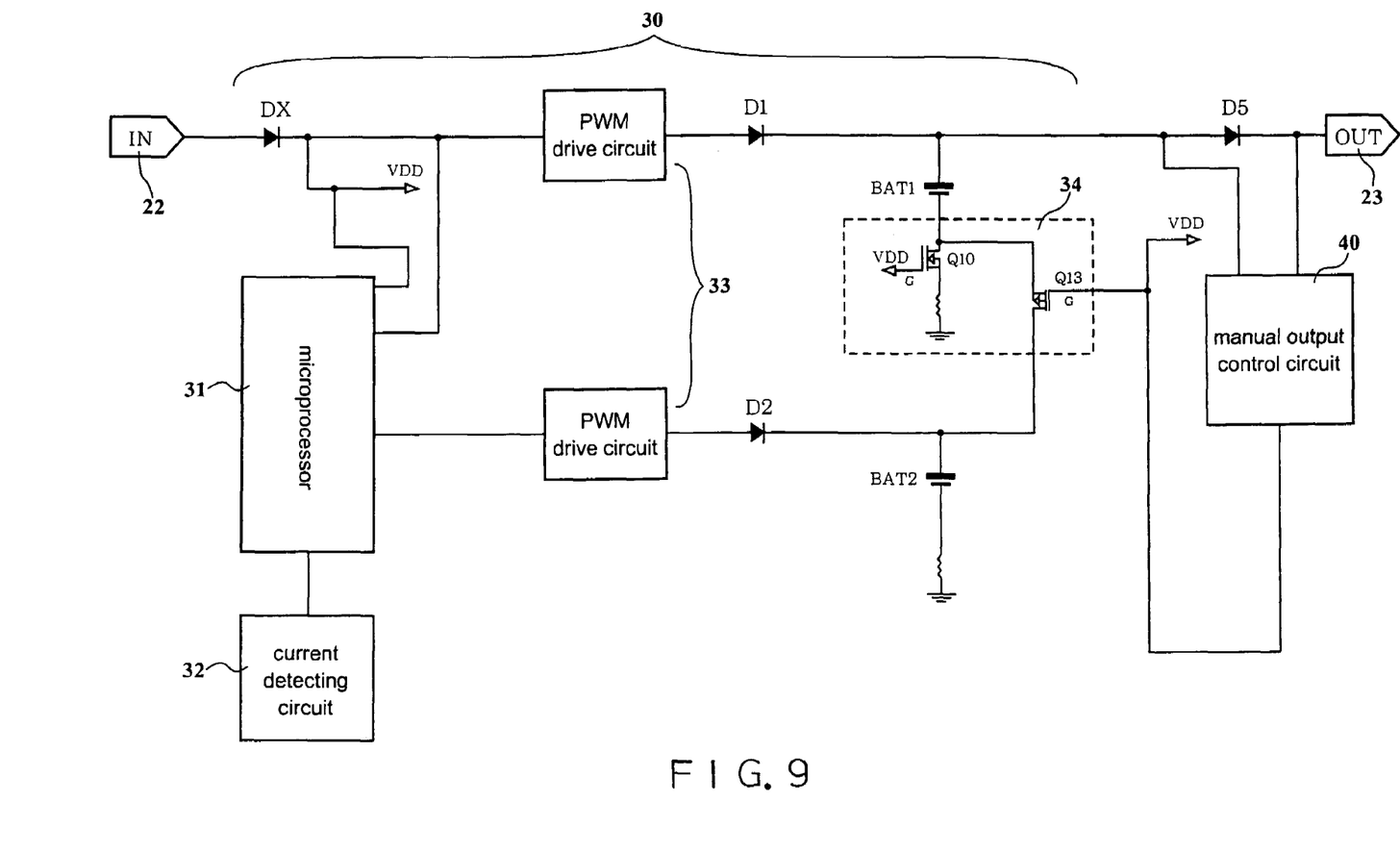
FIG. 9 is a simplified circuit diagram of another embodiment of the invention with two batteries and two charging loops.
Figure 10:
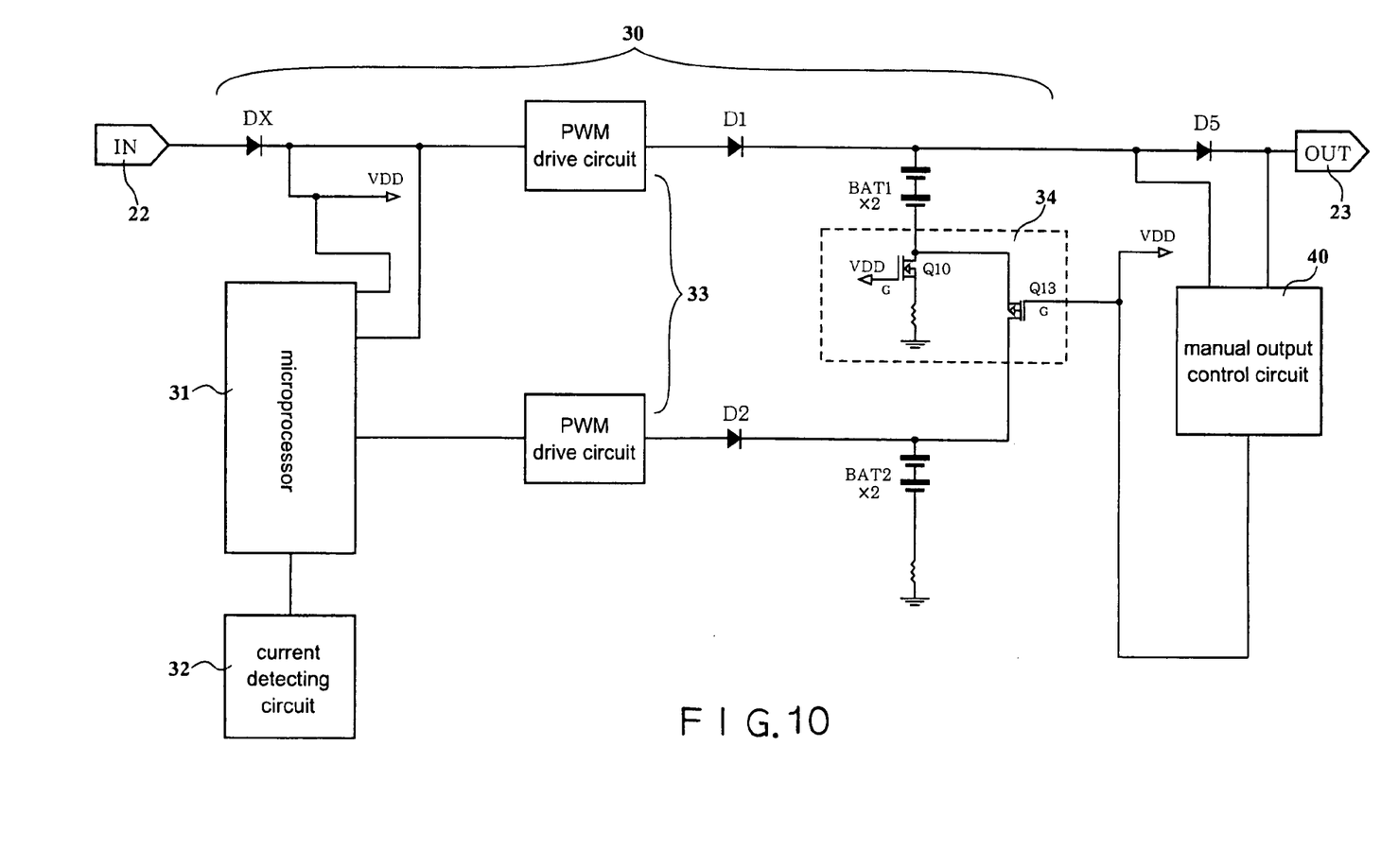
FIG. 10 is a simplified circuit diagram of a further embodiment of the invention with four batteries and two charging loops.

However, we discuss above with four rechargeable batteries and charging circuits, but it is more universal. That the charger can charge independently with several separate charging circuits and the batteries can be connected automatically through an electronic switch to supply power can be included in the invention. The charger in FIG. 9 holds only two batteries; therefore, an electrical switch 34 can divide it into two charging circuits (BAT1) and (BAT2). When the power source is removed, the two batteries are automatically connected in series to supply power. Of course, as shown in FIG. 10, an electrical switch 34 divides it into two charging circuits (BAT1) and (BAT2). Each charging circuit has two batteries which are charged separately in couple. In case of an emergency, the four batteries are joined together to supply power. When two batteries are charged simultaneously, the normal current detecting circuit can detect the full charging signal so that the problem of over-charging can be eliminated. Thus, this application is also practical, although it is not so precise as the individual charging of the batteries.

Many changes and modifications in the above-described embodiments of the invention can, of course, be carried out without departing from the scope thereof. Accordingly, to promote the progress in science and the useful arts, the invention is disclosed and is intended to be limited only by the scope of the appended claims.

What is claimed is:

1. A NiH/NiCd (nickel hydrogen/nickel cadmium) battery charger with the function of emergency power supply, comprising:
   a) a main body having a charging chamber for accommodating a plurality of batteries;
   b) a power input interface positioned at one side of the main body and attached to a mains socket; and
   c) a charging control circuit positioned within the main body to allow an electric connection to the charging chamber and the power input interface, the charging control circuit including:
      i) a microprocessor coupled with a current detecting circuits and a plurality of PWM drive circuit; and
      ii) at least one electrical switch consisting of an N-MOSFET and a P-MOSFET both of which are coupled together, the charging control circuit being divided by the electrical switches into at least two charging loops, the N-MOSFET of the electrical switch having a source to be grounded, a gate electrically coupled to the input power, and a drain coupled to a positive terminal of the battery of the previous charging loop, the P-MOSFET thereof having a source coupled to the drain of the N-MOSFET, a gate electrically coupled to the input power, and a drain coupled to a positive terminal of the battery of the following charging loop;
   wherein, when the power input interface is electrically loaded, the N-MOSFET of the electrical switch is switched on while the P-MOSFET thereof is switched off so that the batteries in the charging chamber are automatically separated for an individual charging process, thereby forming a type of charger; and
   wherein, when the power input interface is electrically unloaded, the N-MOSFET of the electrical switch is switched off while the P-MOSFET thereof is switched on, so that the batteries in the charging loops are automatically connected to supply required power via an emergency power supply interface to electronic units, thereby forming a type of an emergency power supply unit.

2. The NiH/NiCd battery charger with the function of emergency power supply as recited in claim 1 wherein the charging chamber accommodates two batteries, and wherein the charging control circuit is divided by an electrical switch into two charging loops within the charging chamber.

3. The NiH/NiCd battery charger with the function of emergency power supply as recited in claim 1 wherein the charging chamber accommodates four batteries, and wherein the charging control circuit is divided by three electrical switches into four charging loops within the charging chamber.

4. The NiH/NiCd battery charger with the function of emergency power supply as recited in claim 1 wherein the charging chamber accommodates four batteries, and wherein the charging control circuit is divided by an electrical switch into two charging loops within the charging chamber while the charging loops each have two batteries.

5. The NiH/NiCd battery charger with the function of emergency power supply as recited in claim 1 wherein a manual output control circuit provided in front of the emergency power supply interface includes a multistage selector and two P-MOSFETs, such that one of the OFF/ON/EMERGENCY operating modes of the emergency power supply output interface is selectable by means of the multistage selector on the surface of the main body.

6. The NiH/NiCd battery charger with the function of emergency power supply as recited in claim 1 wherein the power input interface is selected from a group consisting of a male connector and a female connector that are positioned on the main body.

7. The NiH/NiCd battery charger with the function of emergency power supply as recited in claim 1 wherein the emergency power supply output interface is selected from a group consisting of a universal serial bus (USB) port and a connector.

* * * * *